(12) United States Patent
Shuto et al.

(10) Patent No.: US 9,817,292 B2
(45) Date of Patent: Nov. 14, 2017

(54) DISPLAY CHARACTERISTICS WITH MEMORABILITY

(71) Applicant: SONY CORPORATION, Tokyo (JP)

(72) Inventors: Aya Shuto, Kanagawa (JP); Ken Kobayashi, Kanagawa (JP); Yuriko Kaino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/125,248

(22) PCT Filed: Feb. 3, 2015

(86) PCT No.: PCT/JP2015/052942
§ 371 (c)(1),
(2) Date: Sep. 12, 2016

(87) PCT Pub. No.: WO2015/141303
PCT Pub. Date: Sep. 24, 2015

(65) Prior Publication Data
US 2017/0108755 A1     Apr. 20, 2017

(30) Foreign Application Priority Data
Mar. 20, 2014 (JP) ................................. 2014-057885

(51) Int. Cl.
*G02F 1/167*  (2006.01)
*C09D 5/44*  (2006.01)

(52) U.S. Cl.
CPC .............. *G02F 1/167* (2013.01); *C09D 5/448* (2013.01); *C09D 5/4411* (2013.01); *G02F 2001/1678* (2013.01)

(58) Field of Classification Search
CPC .............. G02F 1/167; G02F 2001/1678; C09D 5/4411; C09D 5/448
See application file for complete search history.

(56) References Cited

U.S. PATENT DOCUMENTS

2013/0127702 A1 *  5/2013  Kaino ................... G02F 1/0102
345/107

FOREIGN PATENT DOCUMENTS

| JP | 2012-022296 A | 2/2012 |
| JP | 2013-109222 A | 6/2013 |
| JP | 2014-010339 A | 1/2014 |
| WO | 2014/038291 A1 | 3/2014 |

\* cited by examiner

*Primary Examiner* — Joseph P Martinez
(74) *Attorney, Agent, or Firm* — Chip Law Group

(57) ABSTRACT

A display unit of the present invention includes, in an insulating liquid (1), migrating particles (10), and a porous layer (20) formed using a fibrous structure (21), and the fibrous structure (21) includes non-migrating particles (22) having light reflectivity different from light reflectivity of the migrating particles (10) and being at least partially modified with a surfactant.

18 Claims, 8 Drawing Sheets

[ FIG. 1 ]
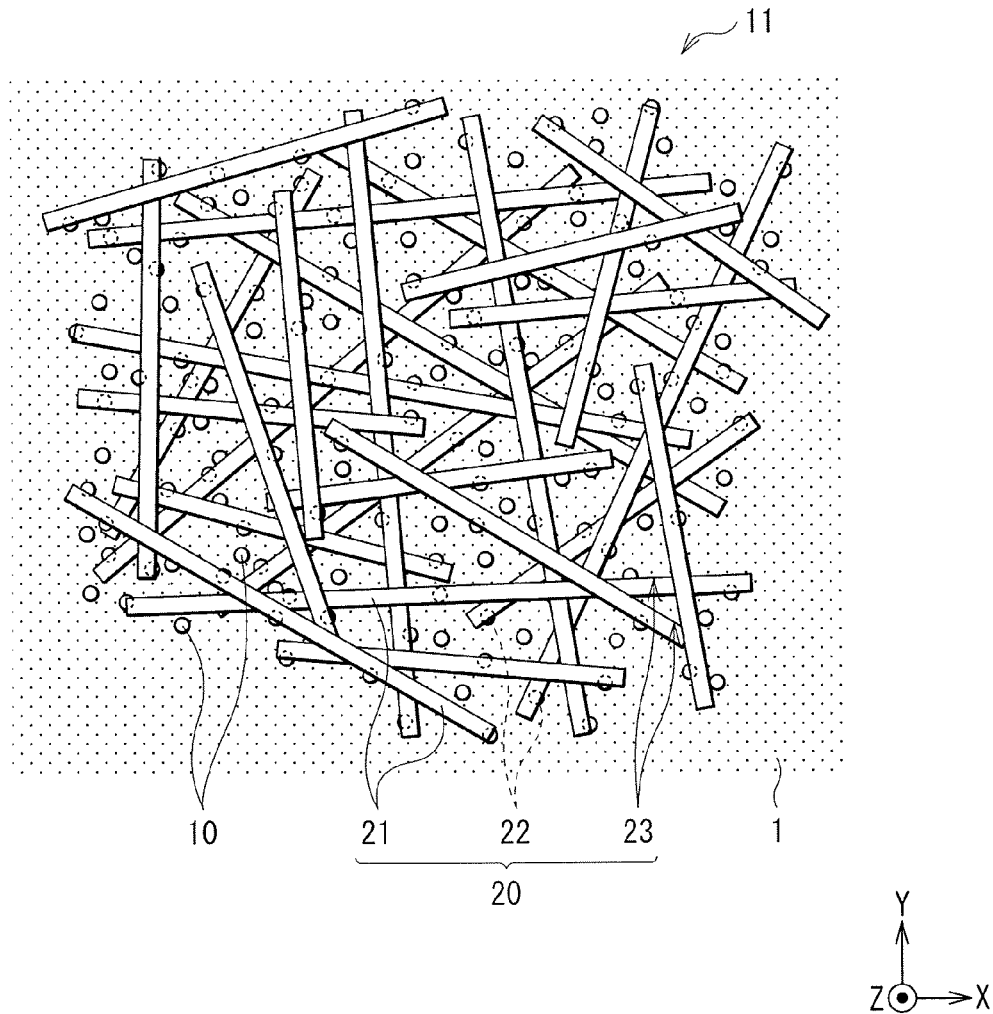
[ FIG. 2 ]
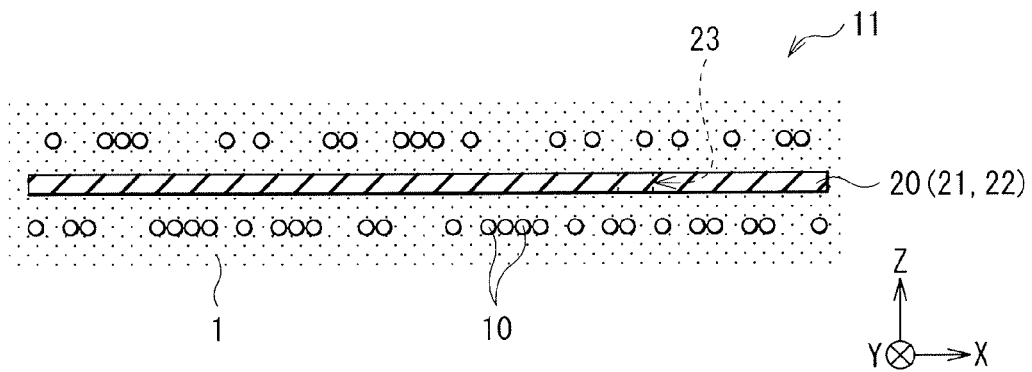

[ FIG. 3A ]
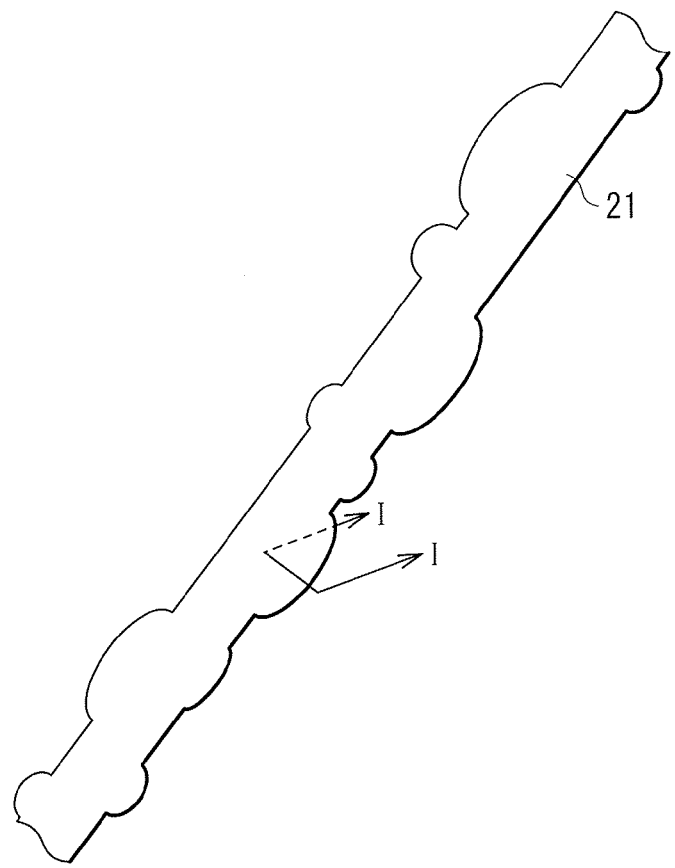
[ FIG. 3B ]
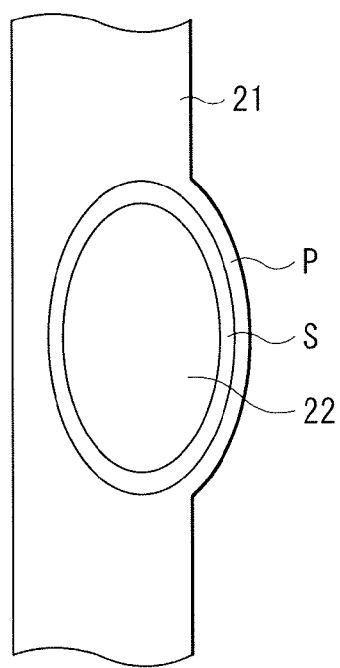

[ FIG. 4 ]
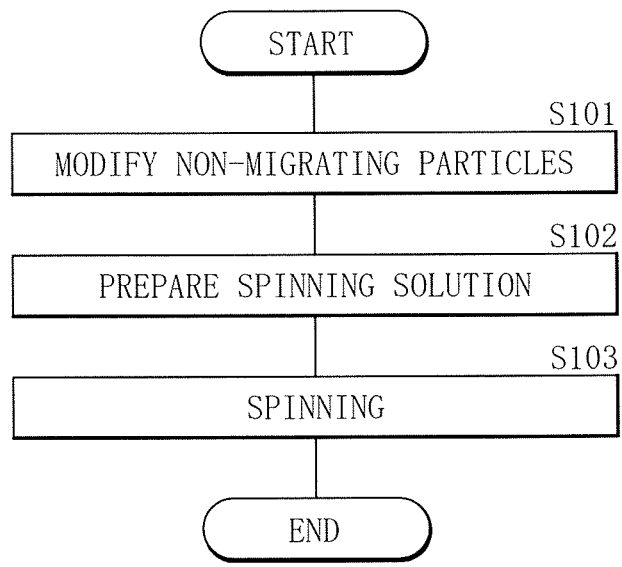

[ FIG. 5 ]
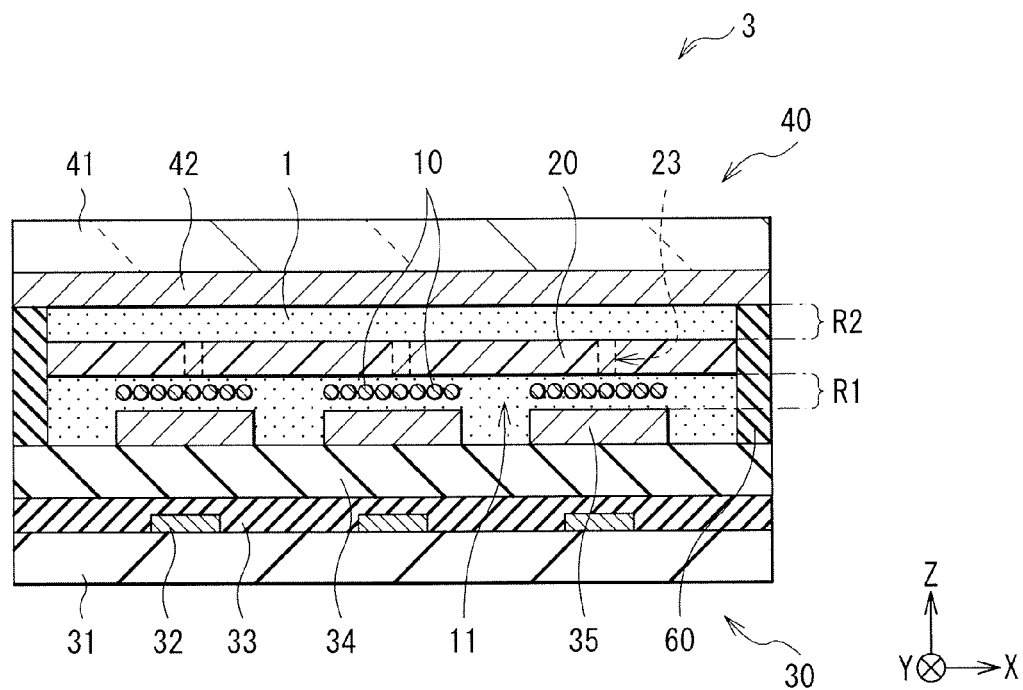
[ FIG. 6 ]
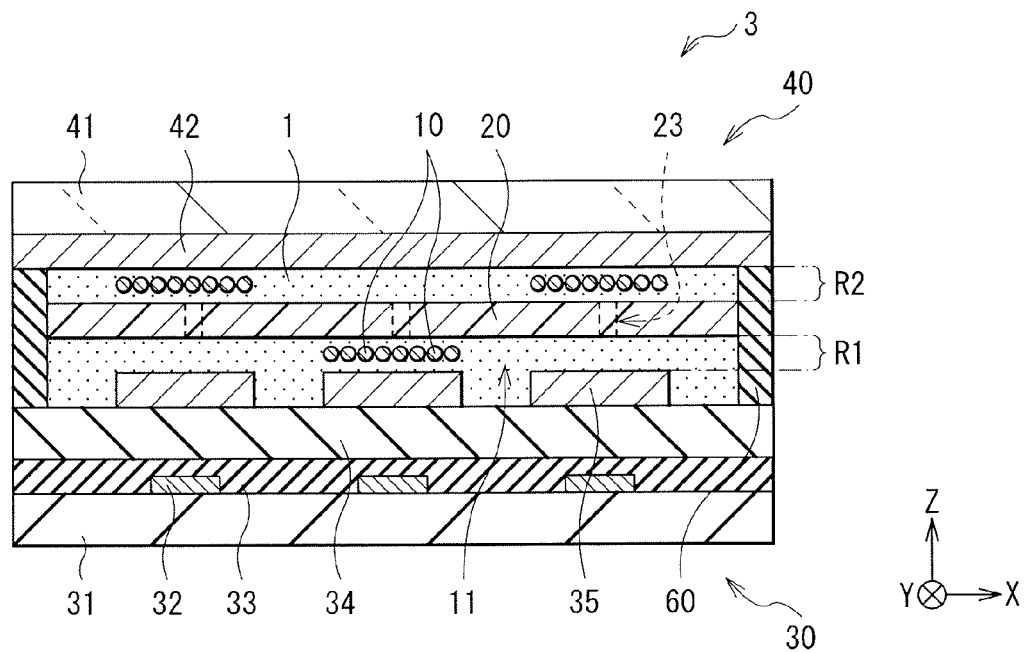

[ FIG. 7A ]
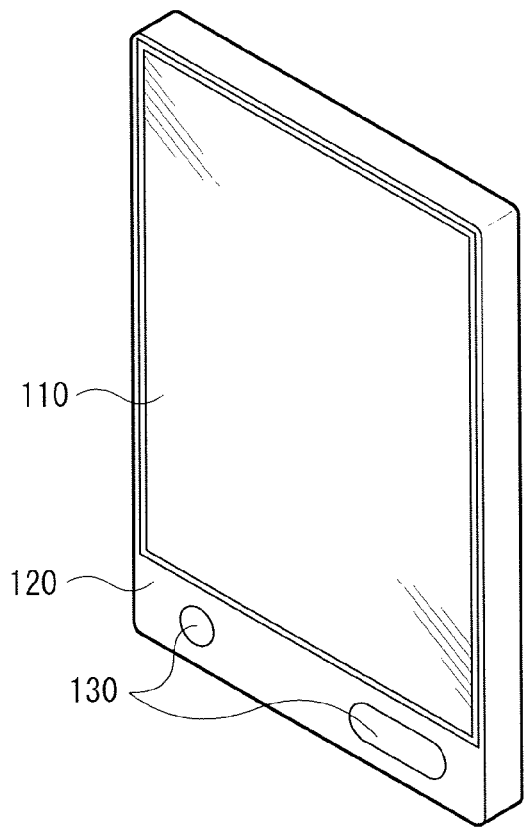
[ FIG. 7B ]
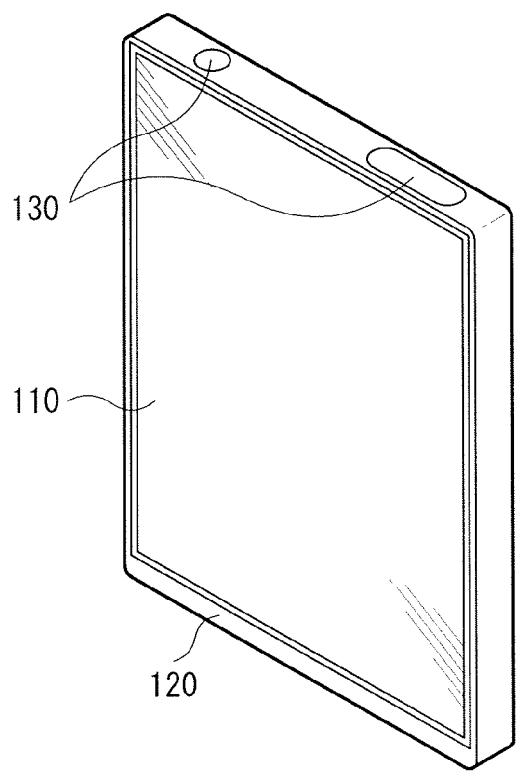

[ FIG. 8 ]
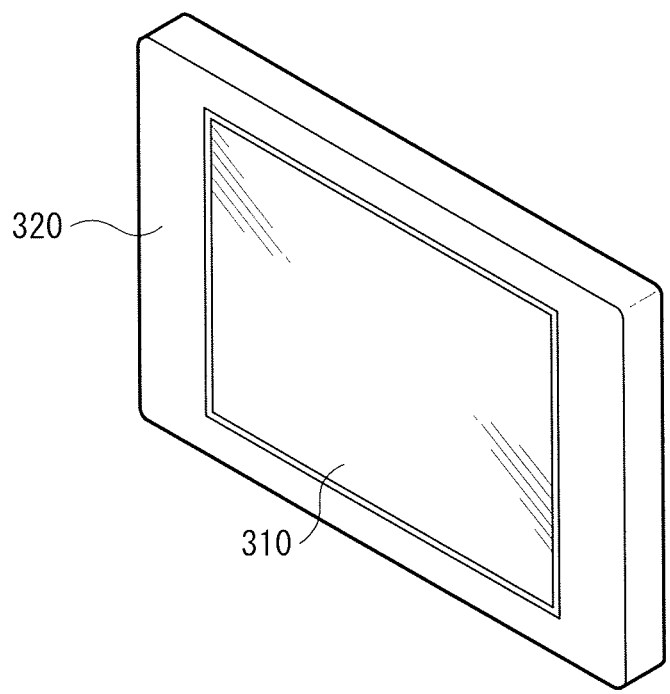

[ FIG. 9A ]
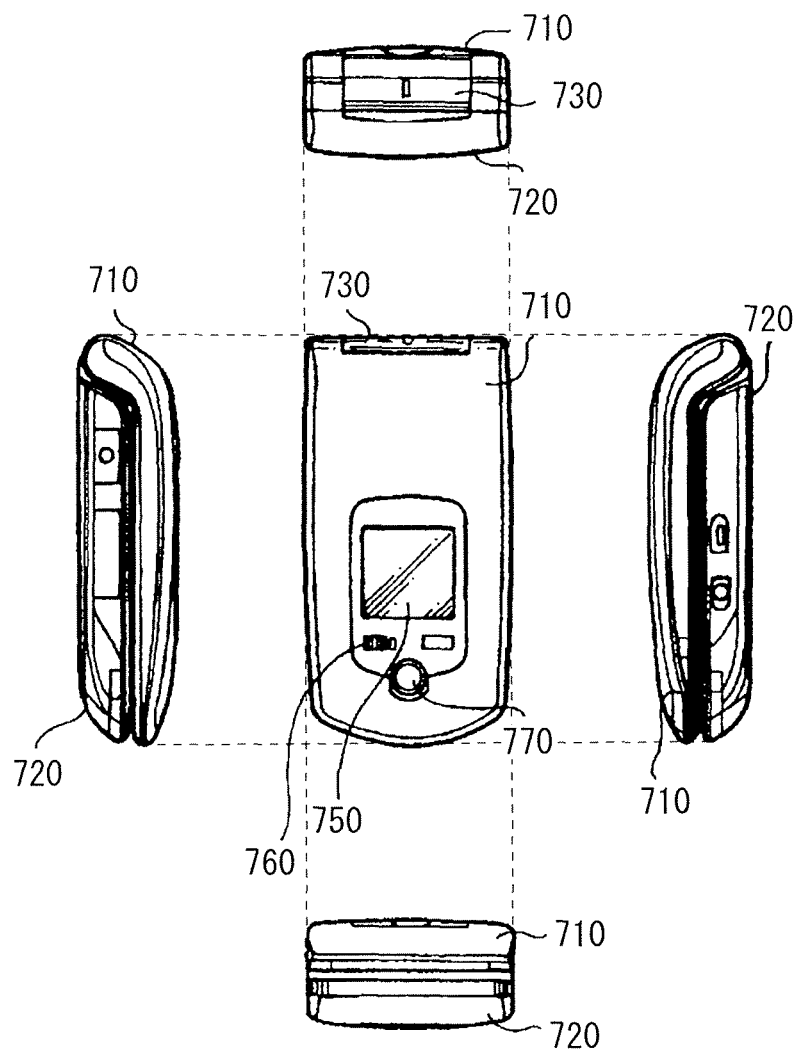

[ FIG. 9B ]
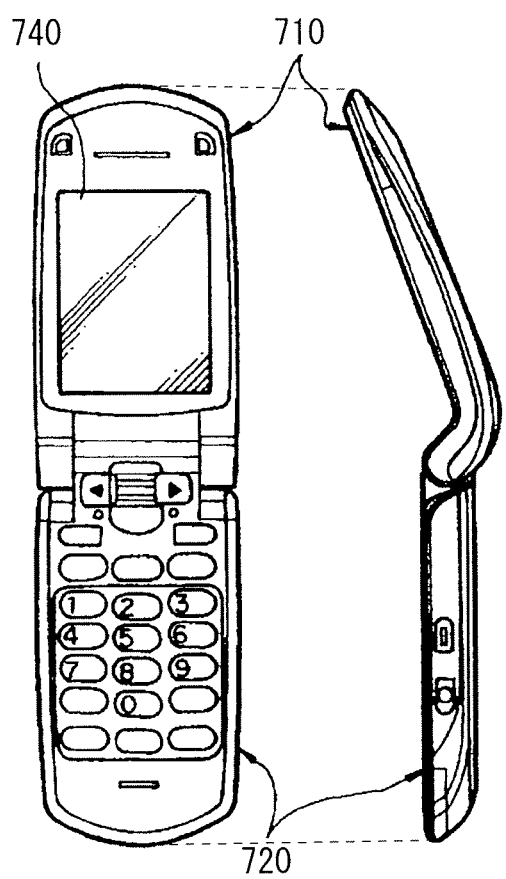

DISPLAY CHARACTERISTICS WITH MEMORABILITY

CROSS REFERENCE TO RELATED APPLICATIONS

This application is a U.S. National Phase of International Patent Application No. PCT/JP2015/052942 filed on Feb. 3, 2015, which claims priority benefit of Japanese Patent Application No. 2014-057885 filed in the Japan Patent Office on Mar. 20, 2014. Each of the above-referenced applications is hereby incorporated herein by reference in its entirety.

TECHNICAL FIELD

The present technology relates to a display unit including an electrophoretic element, a method of manufacturing the same, and an electronic apparatus.

BACKGROUND ART

In recent years, low-power display units (displays) with high image quality have been in increasing demand, as mobile equipment such as mobile telephones and portable information terminals has become widespread. In particular, recently, electronic book delivery businesses have started, and a display having display quality suitable for reading purpose has been desired.

As such a display, various displays such as a cholesteric liquid crystal display, an electrophoretic display, an electric-redox-type display, and a twisting ball display have been proposed. For reading purpose, reflection-type displays are advantageous. In the reflection-type displays, bright display is performed using reflection (diffusion) of outside light in a manner similar to that of paper and thus, display quality close to that of paper is achieved.

Among the reflection-type displays, an electrophoretic display utilizing an electrophoretic phenomenon has a high response speed while consuming low power, and thus is expected as a strong candidate. As a display method thereof, mainly the following two methods have been proposed.

A first method is a method in which two kinds of charged particles are dispersed in an insulating liquid, and the charged particles are moved in response to an electric field. These two kinds of charged particles are different from each other in terms of optical reflection properties, and are also of opposite polarity. In this method, an image is displayed by a change in distribution of the charged particles in response to an electric field.

A second method is a method in which charged particles are dispersed in an insulating liquid, and a porous layer is disposed in the insulating liquid (for example, Patent Literature 1). In this method, the charged particles move through pores of the porous layer in response to an electric field. The porous layer may include, for example, a fibrous structure made of a polymer material, and non-migrating particles that are held in this fibrous structure and different from the charged particles in terms of optical reflection properties.

CITATION LIST

Patent Literature

Patent Literature 1: Japanese Unexamined Patent Application Publication No. 2012-022296

SUMMARY

In the electrophoretic display in which such a porous layer is disposed, display is switched by movement of the charged particles in response to an electric field, and there is a trade-off relation between display characteristics thereof, specifically, memorability, and reflectance and contrast.

Therefore, it is desirable to provide a display unit, a method of manufacturing the display unit, and an electronic apparatus that make it possible to improve reflectance and contrast, while maintaining memorability.

According to an embodiment of the present technology, there is provided a display unit including: migrating particles and a porous layer in an insulating liquid, the porous layer being formed using a fibrous structure, wherein the fibrous structure includes non-migrating particles having light reflectivity different from light reflectivity of the migrating particles and being at least partially modified with a surfactant.

According to an embodiment of the present technology, there is provided a method of manufacturing a display unit, the method including: forming electrophoretic particles; modifying non-migrating particles with a surfactant, the non-migrating particles having light reflectivity different from light reflectivity of the migrating particles; and forming a fibrous structure mixed with the non-migrating particles and used to configure a porous layer.

According to an embodiment of the present technology, there is provided an electronic apparatus including the above-described display unit according to the embodiment of the present technology.

In each of the display unit and the method of manufacturing the display unit according to the embodiment of the present technology, the non-migrating particles are modified with the surfactant, and then the fibrous structure including the non-migrating particles is fabricated, thereby obtaining the fibrous structure in which the non-migrating particles are dispersed and a fiber diameter is reduced.

According to the display unit of the embodiment of the present technology, the method of manufacturing the display unit of the embodiment of the present technology, and the electronic apparatus of the embodiment of the present technology, the fibrous structure contains the non-migrating particles modified with the surfactant, which makes it possible to improve dispersibility of the non-migrating particles in the fibrous structure and to fabricate the fibrous structure in which the fiber diameter is reduced. Therefore, it is possible to provide the display unit and the electronic apparatus that have improved reflectance and contrast while maintaining memorability. It is to be noted that effects described here are not necessarily limited, and may be any of effects described in the present disclosure.

BRIEF DESCRIPTION OF DRAWINGS

FIG. 1 is a plan view of a configuration of an electrophoretic element according to an embodiment of the present technology.

FIG. 2 is a cross-sectional diagram illustrating a configuration of the electrophoretic element illustrated in FIG. 1.

FIG. 3A is a schematic diagram of a fibrous structure of the electrophoretic element illustrated in FIG. 1.

FIG. 3B is an enlarged cross-sectional diagram of the fibrous structure illustrated in FIG. 3A.

FIG. 4 is a flowchart illustrating a manufacturing process of a porous layer of the electrophoretic element illustrated in FIG. 1.

FIG. 5 is a cross-sectional diagram illustrating a configuration of a display unit using the electrophoretic element illustrated in FIG. 1 and other foregoing diagrams.

FIG. 6 is a cross-sectional diagram for describing operation of the display unit illustrated in FIG. 5.

FIG. 7A is a perspective view of an appearance of Application Example 1.

FIG. 7B is a perspective view of another example of an electronic book illustrated in FIG. 7A.

FIG. 8 is a perspective view of an appearance of Application Example 2.

FIG. 9A is a perspective view of an appearance as viewed from a front side of Application Example 3.

FIG. 9B is a perspective view of an appearance as viewed from a back side of Application Example 3.

EMBODIMENTS FOR CARRYING OUT THE INVENTION

Some embodiments of the present technology will be described in detail below with reference to drawings. It is to be noted that the description will be provided in the following order.
1. Embodiment (electrophoretic element)
2. Modification (electrophoretic element: an example in which non-migrating particles having a primary particle size equal to or larger than a predetermined size)
3. Application Examples (display unit and electronic apparatus)
4. Examples

1. EMBODIMENT

FIG. 1 illustrates a plane configuration of an electrophoretic element (an electrophoretic element 11) according to an embodiment of the present technology, and FIG. 2 illustrates a cross-sectional configuration of the electrophoretic element 11. The electrophoretic element 11 is configured to cause contrast by utilizing an electrophoretic phenomenon, and may be applied to, for example, various electronic apparatuses such as a display unit. The electrophoretic element 11 includes a porous layer 20 having migrating particles 10 and pores 23 in an insulating liquid 1. The porous layer 20 has a fibrous structure 21 and non-migrating particles (non-migrating particles 22) held in the fibrous structure 21. In the present embodiment, the non-migrating particles 22 are held in the fibrous structure 21, in a modified state with a surfactant. It is to be noted that FIGS. 1 and 2 each schematically illustrate a configuration of the electrophoretic element 11, and the actual size and shape thereof may be different from those illustrated therein.

The insulating liquid 1 may be configured, for example, of an organic solvent such as paraffin and isoparaffin. For the insulating liquid 1, one kind of organic solvent may be used or a plurality of kinds of organic solvents may be used. Viscosity and a refractive index of the insulating liquid 1 may be preferably as low as possible. When the viscosity of the insulating liquid 1 is decreased, mobility (response speed) of the migrating particles 10 improves. In addition, energy (power consumption) necessary for movement of the migrating particles 10 decreases accordingly. When the refractive index of the insulating liquid 1 is decreased, the difference between the insulating liquid 1 and the porous layer 20 in terms of refractive index becomes wide, which increases reflectance of the porous layer 20.

For example, a coloring agent, an electric charge modifier, a dispersion stabilizer, a viscosity modifier, a surfactant, or a resin may be added to the insulating liquid 1 without limitation.

The migrating particles 10 dispersed in the insulating liquid 1 are one or more charged particles, and the migrating particles 10 being charged move through the pores 23 in response to an electric field. The migrating particles 10 have any optical reflection property (optical reflectance), and contrast (CR) occurs by a difference between optical reflectance of the migrating particles 10 and optical reflectance of the porous layer 20. For example, the migrating particles 10 may perform bright display while the porous layer 20 performs dark display, or the migrating particles 10 may perform dark display while the porous layer 20 performs bright display.

When the electrophoretic element 11 is viewed from outside, the migrating particles 10 may be visually recognized as, for example, white or a color close to white if the migrating particles 10 perform bright display, whereas the migrating particles 10 may be visually recognized as, for example, black or a color close to black if the migrating particles 10 perform dark display. Such a color of the migrating particles 10 is not limited in particular if the color allows contrast to be caused.

The migrating particles 10 may be configured of, for example, particles (powder) of an organic pigment, an inorganic pigment, a dye, a carbon material, a metallic material, a metal oxide, glass, a polymer material (resin), or any other like material. One kind of or two or more kinds of these may be used for the migrating particles 10. Crushed particles of a resin solid including the above-described particles, capsule particles, or any other like particles may also be used to configure the migrating particles 10. It is to be noted that materials corresponding to the above-described carbon material, metallic material, metal oxide, glass, and polymer material are excluded from materials corresponding to the organic pigment, inorganic pigment, and dye. The migrating particles 10 may have, for example, a particle size of 30 nm to 300 nm.

Examples of the organic pigment may include azo-based pigments, metal-complex-azo-based pigments, polycondensed azo-based pigments, flavanthrone-based pigments, benzimidazolone-based pigments, phthalocyanine-based pigments, quinacridone-based pigments, anthraquinone-based pigments, perylene-based pigments, perinone-based pigments, anthrapyridine-based pigments, pyranthrone-based pigments, dioxazine-based pigments, thioindigo-based pigments, isoindolinone-based pigments, quinophthalone-based pigments, and indanthrene-based pigments. Examples of the inorganic pigment may include flowers of zinc, antimony white, black iron oxide, titanium boride, red iron oxide, mapico yellow, minium, cadmium yellow, zinc sulfide, lithopone, barium sulfide, cadmium selenide, calcium carbonate, barium sulfate, lead chromate, lead sulfate, barium carbonate, white lead, and alumina white. Examples of the dye may include nigrosine-based dyes, azo-based dyes, phthalocyanine-based dyes, quinophthalone-based dyes, anthraquinone-based dyes, and methine-based dyes. Examples of the carbon material may include carbon black. Examples of the metallic material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a polymer compound into which a functional group having an optical absorption spectrum in a visible light region is introduced. As long as the polymer compound having the optical absorption spectrum in the visible light region is adopted, the kind thereof is not limited in particular.

A specific material of the migrating particles 10 may be selected, for example, depending on a role played by the migrating particles 10 to cause the contrast. If the migrating particles 10 perform bright display, for example, the metal oxide such as titanium oxide, zinc oxide, zirconium oxide, barium titanate, and potassium titanate may be used for the migrating particles 10. If the migrating particles 10 perform dark display, for example, the carbon material such as carbon black, or the metal oxide such as copper-chromium oxide, copper-manganese oxide, copper-iron-manganese oxide, copper-chromium-manganese oxide, and copper-iron-chromium oxide may be used for the migrating particles 10. Above all, the carbon material may be preferable. The migrating particles 10 made of the carbon material exhibit superior chemical stability, mobility, and light absorption property.

The content (concentration) of the migrating particles 10 in the insulating liquid 1 is not limited in particular, but may be, for example, 0.1 wt % to 10 wt %. In this concentration range, shielding properties and mobility of the migrating particles 10 are secured. Specifically, when the content of the migrating particles 10 is below 0.1 wt %, shielding (hiding) of the porous layer 20 by the migrating particles 10 may be difficult, and contrast may not be sufficiently caused. In contrast, when the content of the migrating particles 10 is more than 10 wt %, dispersibility of the migrating particles 10 may decrease, which makes the migrating particles 10 move less easily, thereby leading to a possibility of occurrence of agglomeration.

Preferably, the migrating particles 10 may be readily dispersed and charged in the insulating liquid 1 for a long time, while being less easily adsorbed on the porous layer 20. Therefore, for example, a dispersant may be added to the insulating liquid 1. A dispersant and an electric charge modifier may be used together.

This dispersant or electric charge modifier may have, for example, either negative or positive electric charges, or both, and is provided to increase an electric charge amount in the insulating liquid 1 and to disperse the migrating particles 10 by electrostatic repulsion. Examples of such a dispersant may include the Solsperce series available from The Lubrizol Corporation, the BYK series and the Anti-Terra series available from BYK-Chemic GmbH, and the Span series available from TCI Americas Inc.

A surface treatment may be applied to the migrating particles 10 to improve dispersibility of the migrating particles 10. Examples of the surface treatment may include a rosin treatment, a surfactant treatment, a pigment derivative processing, a coupling agent treatment, a graft polymerization treatment, and a microencapsulation treatment. In particular, any of the graft polymerization treatment, the microencapsulation treatment, and a combination of these treatments makes it possible to maintain long-term dispersion stability of the migrating particles 10.

Examples of a material used for such a surface treatment may include a material (an adsorptive material) that has a functional group that is absorbable on the surface of the migrating particle 10 and a polymeric functional group. The absorbable functional group is determined according to the material forming the migrating particle 10. For example, an aniline derivative such as 4-vinyl aniline may be allowed to be adsorbed when the migrating particle 10 is configured of the carbon material such as carbon black, and an organosilane derivative such as methacrylate-3-(trimethoxysilyl)propyl may be allowed to be adsorbed when the migrating particle 10 is configured of the metal oxide. Examples of the polymeric functional group may include a vinyl group, an acrylic group, and a methacryl group.

A surface treatment may be performed by introducing a polymeric functional group onto the surface of the migrating particle 10, and grafting the polymeric functional group thereon (a graft material). The graft material may have, for example, a polymeric functional group and a functional group for dispersion. The functional group for dispersion disperses the migrating particles 10 in the insulating liquid 1, and maintains dispersibility by steric hindrance. When the insulating liquid 1 is, for example, paraffin, a branched-alkyl group or any other like group may be used as the functional group for dispersion. Examples of the polymeric functional group may include a vinyl group, an acrylic group, and a methacryl group. In order to cause polymerization and grafting of the graft material, a polymerization initiator such as azobisisobutyronitrile (AIBN), for example, may be used. In addition, it may be possible to use a material having an alkyl chain to provide a functional group that is absorbable on the surface of the migrating particle 10 and dispersibility. Examples of such a material may include a titanate coupling agent (for example, KR-TTS, available from Ajinomoto Fine-Techno Co., Inc.) and an aluminate coupling agent.

For reference, details of a way of dispersing the migrating particles 10 in the insulating liquid 1 as described above are described in books such as "Dispersion technology of ultrafine particles and evaluation thereof: surface treatment and fine grinding, as well as dispersion stability in air/liquid/polymer (Science & Technology Co., Ltd.)".

The porous layer 20 allows for shielding of the migrating particles 10, and is modified with the fibrous structure 21 and the surfactant, and has the non-migrating particles 22 held in the fibrous structure 21. This porous layer 20 is a three-dimensional structure (an irregular network structure such as a nonwoven fabric) formed using the fibrous structure 21, and has a plurality of openings (the pores 23). Configuring the three-dimensional structure of the porous layer 20 by using the fibrous structure 21 causes diffused reflection (multiple scattering) of light (outside light), thereby increasing the reflectance of the porous layer 20. Therefore, even in a case in which the porous layer 20 has a small thickness, it is possible to obtain high reflectance, and also to reduce energy necessary to move the migrating particles 10, while improving the contrast of the electrophoretic element 11. In addition, an average pore size of the pore 23 is made large, and a larger number of pores 23 are provided. This allows the migrating particles 10 to move easily through the pores 23, increases response speed, and further reduces the energy necessary to move the migrating particles 10. The thickness of the porous layer 20 as described above may be, for example, 5 μm to 100 μm.

The fibrous structure 21 is a fibrous substance having a length sufficient for a fiber diameter (a diameter). For example, a plurality of fibrous structures 21 may be gathered and stacked at random to form the porous layer 20. The single fibrous structure 21 may be twisted at random to form the porous layer 20. Alternatively, a portion configured of the single fibrous structure 21 and a portion configured of the plurality of fibrous structures 21 may exist in a mixed manner in the porous layer 20.

For example, the fibrous structure 21 may extend linearly. The fibrous structure 21 may have any shape, and may be, for example, curled, or bent at some point. Alternatively, the fibrous structure 21 may be branched at some point.

The fibrous structure 21 may have a minimum fiber diameter of, for example, preferably, 500 nm or less, and more preferably, 300 nm or less. An average fiber diameter may be preferably, for example, 50 nm or more and 2000 nm or less, but may be outside this range. Providing a small average fiber diameter allows diffused reflection of light to occur easily, and also allows the size of the pore 23 to be large. The fiber diameter of the fibrous structure 21 is determined so that the fibrous structure 21 is allowed to hold the non-migrating particles 22. It may be possible to measure the average fiber diameter through, for example, microscopy using a scanning electron microscope or any other microscope. The average length of the fibrous structure 21 may be arbitrary. The fibrous structure 21 may be formed by, for example, but not limited to, a phase separation method, a phase inversion method, an electrostatic (electric field) spinning method, a melt spinning method, a wet spinning method, a dry spinning method, a gel spinning method, a sol-gel method, or a spray coating method. Using such a method makes it easy to form the fibrous structure 21 having a length sufficient for the fiber diameter, in a simple and stable manner.

The fibrous structure 21 may be preferably configured of a nanofiber. Here, the nanofiber is a fibrous substance having a fiber diameter of 1 nm to 1000 nm, and having a length hundred times or more the fiber diameter. Use of such a nanofiber for the fibrous structure 21 makes it easy to cause the diffused reflection of light, thereby making it possible to improve the reflectance of the porous layer 20 further. In other words, it is possible to improve the contrast of the electrophoretic element 11. In addition, in the fibrous structure 21 made of the nanofiber, a proportion of the pores 23 occupying a unit volume is made large, and the migrating particles 10 are allowed to pass through the pores 23 easily. Therefore, it is possible to reduce the energy necessary for the movement of the migrating particles 10. The fibrous structure 21 made of the nanofiber may be preferably formed by an electrostatic spinning method. Using the electrostatic spinning method makes it easy to form the fibrous structure 21 having a small fiber diameter, in a simple and stable manner.

For the fibrous structure 21, a structure whose optical reflectance is different from that of the migrating particles 10 may be preferably used. This makes it easy to form contrast by a difference between the porous layer 20 and the migrating particles 10 in terms of optical reflectance. The fibrous structure 21 that exhibits optical transparency (colorlessness and transparency) in the insulating liquid 1 may be used.

The pore 23 is configured by stacking of the plurality of fibrous structures 21 or twisting of the single fibrous structure 21. This pore 23 may preferably have an average pore size as large as possible to allow for easy movement of the migrating particle 10 through the pore 23. The average pore size of the pore 23 may be, for example, 0.1 μm or more and 10 μm or less.

The non-migrating particles 22 are one or more particles fixed to the fibrous structure 21, and are not electrophoretic. FIG. 3A schematically illustrates a portion of the fibrous structure holding the non-migrating particles. The non-migrating particles 22 may be buried in the fibrous structure 21 holding the non-migrating particles 22, or may be partially protruded from the fibrous structure 21.

A material having optical reflectance different from the optical reflectance of the migrating particles 10 is used for the non-migrating particles 22. The non-migrating particles 22 may be configured of a material similar to that of the above-described migrating particles 10. Specifically, the material in a case where the above-described migrating particles 10 perform bright display and the material in a case where the above-described migrating particles 10 perform dark display may be respectively used in a case where the non-migrating particles 22 (the porous layer 20) perform bright display and in a case where the non-migrating particles 22 perform dark display. When the porous layer 20 performs bright display, the non-migrating particles 22 may be preferably configured of metal oxide. This makes it possible to obtain favorable chemical stability, fixity, and light reflectivity. The material of the non-migrating particles 22 and the material of the migrating particles 10 may be the same, or may be different. A color visually recognized from outside when the non-migrating particles 22 perform bright display or dark display is similar to that described for the above-described migrating particles 10.

In the present embodiment, the surface of the non-migrating particle 22 is modified with a surfactant. Examples of the surfactant may include a negative ion (anionic) surfactant having, for example, a carboxylic acid, sulfonic acid, or phosphoric acid structure as a hydrophilic group, and a positive ion (cationic) surfactant having, for example, tetraalkylammonium or alkylamine as a hydrophilic group. In addition, there may be used a non-ionic (nonionic) surfactant in which a hydrophobic portion is a non-electrolyte, namely, a non-ionized hydrophobic portion is provided, and an amphoteric surfactant having both an anionic portion and a cationic portion in a molecule. Examples of the amphoteric surfactant may include alkyldimethylamine oxide and alkylcarboxy betaine. In the present embodiment, any of the above-described surfactants may be used. It is to be noted that when a metallic material such as titanium oxide is used for the non-migrating particles 22, it may be preferable to use the anionic surfactant. In particular, the surfactant having a hydrophilic group with a small molecule volume such as carboxylic acid may be preferable because the entire surface of the non-migrating particle 22 is easily covered with this surfactant.

The porous layer 20 as described above may be allowed to be formed, for example, by the following method. FIG. 4 illustrates a flow of a procedure of forming the porous layer 20. First, titanium oxide having, for example, two kinds of primary particle sizes (for example, 250 nm (small particles) and, for example, 450 nm (large particles)) may be prepared for the non-migrating particles 22, and these may be added to, for example, an organic solvent in which a carboxylic acid-based anionic surfactant is dissolved, and then stirred. The titanium oxide (the non-migrating particles 22) in which the surface is covered with the carboxylic acid-based anionic surfactant is thereby obtained (step S101). Next, for example, a solution may be prepared by dissolving the material of the fibrous structure 21 such as a polymer material (a polymer) in, for example, an organic solvent, and then the above-described non-migrating particles 22 are added to this solution and then sufficiently stirred, so that a spinning solution for dispersing the non-migrating particles 22 is prepared (step S102). Finally, the non-migrating particles 22 may be fixed to the fibrous structure 21 by performing spinning from this spinning solution by, for example, an electrostatic spinning method, so that the porous layer 20 is formed (step S103). It is to be noted that, here, the primary particle size is a minimum particle size, and may represent the particle size of each of the individual particles in a case where, for example, the particles are agglomerated or connected.

In this way, dispersibility of the non-migrating particles 22 in the spinning solution is improved by using the non-migrating particles 22 modified beforehand with the surfactant. This allows for easy application of an electric field to the non-migrating particles 22 during the spinning, and the fibrous structure 21 having a reduced fiber diameter, namely, with a thinned fiber, is obtained. It is to be noted that the surface of the non-migrating particle 22 fixed to the fibrous structure 21 is covered with the polymer included in the fibrous structure 21 as illustrated in FIG. 3A. FIG. 3B illustrates a cross-sectional configuration taken along a line I-I in FIG. 3A. In other words, the cross-sectional configuration of the fibrous structure holding the non-migrating particle has a three-layer structure including the non-migrating particle 22, a surfactant layer S, and a polymer layer P.

Further, the porous layer 20 may be obtained by forming the pores 23 in a polymeric film by perforation processing with a laser, or a cloth woven of synthetic fibers or any other like fibers, or an open-cell foam porous polymer or any other like material may be used for the porous layer 20.

It is to be noted the fibrous structure 21 may preferably include, for example, a molecule having a main backbone (a main portion of the molecule) configured of a carbon atom, an oxygen atom, and a hydrogen atom. In other words, the main backbone of this molecule does not include any atom other than the carbon atom, the oxygen atom, and the hydrogen atom, and is made of only these atoms. It may be preferable that such a molecule forming the fibrous structure 21 not include a functional group having high polarity, such as a hydroxyl group and a carboxylic acid group. This decreases an absolute value of surface potential of the fibrous structure 21, thereby allowing for an improvement in response speed of the electrophoretic element 11. Here, the main backbone refers to a portion except for both ends of the molecule. The molecule forming the fibrous structure 21 may be preferably configured of the carbon atom, the oxygen atom, and the hydrogen atoms up to both ends, but each end may include an atom other than the carbon atom, the oxygen atom, and the hydrogen atom. For example, in a case where a polymer is synthesized by radical polymerization, a polymerization initiator such as azobisisobutyronitrile (AIBN) may be used for a catalyst. A nitrogen atom or any atom other than the carbon atom, the oxygen atom, and the hydrogen atom may be included in both ends of the polymer thus synthesized, but this atom in the end is less than one-thousandth of the entire molecule in terms of molecular weight. Therefore, this atom in the end hardly contributes to the properties of the molecule. This also holds true for polymerization initiators other than AIBN. In this way, reactivity of the fibrous structure 21 configured of only the carbon atom, the oxygen atom, and the hydrogen atom is low and thus, the fibrous structure 21 is stably present in the insulating liquid 1. Therefore, high reliability is achieved in the electrophoretic element 11.

The molecule forming the fibrous structure 21 is a chain-shaped polymer. Here, a chain-shaped molecule (a chain molecule) refers to a molecule that does not include a ring-shaped atomic arrangement structure. Examples of the ring-shaped atomic arrangement may include an isocyclic compound and a heterocyclic compound. The isocyclic compound is configured of a single element, and is, specifically, but not limited to, an aromatic compound, cycloalkene, cycloalkane, or cycloalkyne. The heterocyclic compound is configured of two or more kinds of elements, and is, specifically, but not limited to, pyrrole, carbazole, cyclic acetal, pyran, furan, or thiophene. The chain molecule may be shaped like a straight chain, or may be branched. Configuring the fibrous structure 21 of the chain molecule makes steric hindrance small, as compared with a molecule including a ring-shaped structure and therefore, the migrating particles 10 are allowed to move easily, which improve the contrast and the response speed of the electrophoretic element 11.

An ester group is included in the chain molecule used to configure the fibrous structure 21. For example, the fibrous structure 21 may be preferably made of an acrylic resin. Examples of the specific chain molecule may include polyalkyl methacrylate, polyalkyl acrylate, polyalkenyl methacrylate, polyalkenyl acrylate, polyalkynyl methacrylate, and polyalkynyl acrylate. This chain molecule does not have a functional group with polarity higher than that of an ester group, and the absolute value of the surface potential of the fibrous structure 21 may be, for example, 20 mV or less. It may be more preferable to select a chain molecule that allows the absolute value of the surface potential of the fibrous structure 21 to be 10 mV or less. In other words, although the polarity of the ester group is small as compared with that of the above-described cyano group etc., the polarity of the ester group is sufficiently large for the spinning using the electric field spinning method, and this makes it easy to form the fibrous structure 21 by the electric field spinning method.

It may be preferable to use a material that is hard to be biodegraded, for the chain molecule used to configure the fibrous structure 21. In other words, the chain molecule may preferably have resistance to biodegradation. Examples of a polymer having biodegradability may include polylactic acid, polyvinyl alcohol, cellulose acetate, collagen, gelatin, and chitosan. This type of polymer is easily degraded, and therefore may be unable to maintain the characteristics of the fibrous structure when the electrophoretic element receives some kind of stimulus from outside. In addition, many of this type of polymers are soluble, and may be unable to maintain the shape of the fibrous structure by dissolving in moisture within the electrophoretic element. In contrast, when the fibrous structure 21 is formed using the chain molecule having resistance to biodegradation, stability of the fibrous structure 21 increases. Therefore, it is possible to improve reliability of the electrophoretic element 11. The surface of the fibrous structure 21 may be covered with any protective layer.

A typical electrophoretic element causes contrast by using the difference between the optical reflectance of the migrating particles and the optical reflectance of the porous layer, as described above. Specifically, of the migrating particle and the porous layer, one that performs bright display has the optical reflectance higher than the optical reflectance of the other that performs dark display. It may be preferable that the porous layer perform bright display, and the migrating particles perform dark display, by making the optical reflectance of the non-migrating particles higher than that of the migrating particles. Performing such display considerably increases the optical reflectance in performing bright display, by utilizing the diffused reflection of light by the porous layer (the three-dimensional structure). Therefore, the contrast also considerably improves accordingly.

In the electrophoretic element, the migrating particles move through the pores of the porous layer within a range of application of an electric field. An image is displayed by performing either bright display or dark display, according to a region where the migrating particles move and a region where the migrating particles do not move.

In a display unit (an electrophoretic display) with the above-described electrophoretic element, display characteristics are not sufficient, and a further improvement in reflectance, in particular, has been desired. It is possible to improve the reflectance by using non-migrating particles having a large particle size (for example, 400 nm to 700 nm). For example, in a display unit in which the migrating particles perform dark display and the porous layer performs bright display, it is conceivable that an improvement in ability to shield the migrating particles may be possible by increasing the particle size of the non-migrating particles fixed to the fibrous structure and increasing the quantity thereof. However, if the ratio of the non-migrating particles having the large particle size is increased, the dispersibility of the non-migrating particles declines and the quantity of the polymer of the fibrous structure decreases and therefore, an appropriate fibrous structure may be unobtainable. In addition, if the spinning is performed by adding, for example, a dispersant such as a surfactant to a spinning solution to improve dispersibility, the dispersibility of the non-migrating particles in the solution may increase, but the dispersant may be exposed on the surface of the fibrous structure, and display retention characteristics (memorability) may deteriorate. The memorability is a property necessary to make use of an advantage, which is low power consumption, of the display unit (the electrophoretic display) with the electrophoretic element.

Therefore, it is expected to improve the reflectance, while preventing deterioration of the memorability due to a reduction in the average fiber diameter of the fibrous structure. An example of a generally used a method of reducing the fiber diameter may be a method of adding an additive (for example, inorganic salts such as lithium chloride, halide salts of organic quaternary ammonium, and various surfactants) to a polymer used to configured a fibrous structure. However, even if this method is used, the functional group of the additive is exposed on the surface of the fibrous structure, thereby leading to deterioration of the memorability, which is an issue.

In contrast, in the display unit with the electrophoretic element 11 and a method of manufacturing the same, the non-migrating particles 22 modified beforehand with the surfactant is used, when the spinning of the fibrous structure 21 is performed. This improves the dispersibility of the non-migrating particles 22 in the spinning solution, and makes it easy to apply an electric field to the non-migrating particles 22 in the spinning. Therefore, the fibrous structure 21 is allowed to have a thinned fiber, and the reflectance improves. In addition, the exposure of the surfactant on the surface of the fibrous structure 21 is reduced by causing the surfactant to modify the non-migrating particles 22 and therefore, passage of the migrating particles 10 in the porous 20 improves, and memorability is maintained.

As described above, in the display unit with the electrophoretic element 11 of the present embodiment and the method of manufacturing the same, the non-migrating particles 22 modified beforehand with the surfactant is added to the spinning solution. Therefore, the dispersibility of the non-migrating particles 22 in the spinning solution increases, and it is possible to fabricate the fibrous structure 21 having a small fiber diameter. It is therefore possible to provide a display unit and an electronic apparatus in which the reflectance and the contrast of the porous layer 20 are improved. Moreover, since the exposure of the functional group of the surfactant on the surface of the fibrous structure 21 is reduced, it is also possible to maintain the memorability.

A modification of the above-described embodiment will be described below. In the following description, the same components as those of the above-described embodiment will be provided with the same reference numerals as those thereof, and the description will be omitted as appropriate.

2. MODIFICATION

In the above-described embodiment, the particles having the primary particle sizes different from each other (large particles of, for example, 450 nm, and small particles of, for example, 250 nm) are used for the non-migrating particles 22 of the porous layer 20, but it may be preferable to use particles of a certain primary particle size or greater, for example, particles of 450 nm or more. Using the non-migrating particles 22 having the primary particle size of 450 nm or more reduces the ratio of the non-migrating particles 22 included in the fibrous structure 21, thereby making it possible to provide the fibrous structure 21 having a portion formed of only a polymer fiber. This provides the porous layer 20 in which the average pore size of the pores 23 is increased and the multiple pores 23 are formed. Therefore, the migrating particles 10 move through the pores 23 more easily, the response speed improves, and the energy necessary to move the migrating particles 10 is reduced.

3. APPLICATION EXAMPLES (Display Unit)

Next, description will be given of application examples of the above-described electrophoretic element 11. The electrophoretic element 11 may be applied, for example, to a display unit.

FIG. 5 illustrates an example of a cross-sectional configuration of a display unit (a display unit 3) using the electrophoretic element 11. This display unit 3 is an electrophoretic display unit (a so-called electronic paper display) that displays an image (for example, character information) by utilizing an electrophoretic phenomenon, and includes the electrophoretic element 11 provided between a drive substrate 30 and a counter substrate 40. A distance between the drive substrate 30 and the counter substrate 40 is adjusted to be a predetermined distance by a spacer 60.

The drive substrate 30 may have, for example, a TFT (Thin Film Transistor) 32, a protective layer 33, a planarizing insulating layer 34, and a pixel electrode 35 in this order on one surface of a plate-like member 31. The TFT 32 and the pixel electrode 35 may be arranged, for example, in a matrix or in a segment form corresponding to a pixel arrangement.

The plate-like member 31 may be made of, for example, but not limited to, an inorganic material, a metallic material, or a plastic material. Examples of the inorganic material may include silicon (Si), silicon oxide (SiOx), silicon nitride (SiNx), and aluminum oxide (AlOx). Examples of the silicon oxide may include glass and spin-on-glass (SOG). Examples of the metallic material may include aluminum (Al), nickel (Ni), and stainless steel. Examples of the plastic material may include polycarbonate (PC), polyethylene terephthalate (PET), polyethylene naphthalate (PEN), and polyethyl ether ketone (PEEK).

In the display unit 3, an image is displayed on the counter substrate 40 side and thus, the plate-like member 31 may be optically non-transparent. The plate-like member 31 may be configured of a rigid substrate such as a wafer, or may be configured of, for example, but not limited to, a thin-layer glass or a film having flexibility. The display unit 3 that is flexible (foldable) is achievable by using a flexible material for the plate-like member 31.

The TFT 32 is a switching element used to select a pixel. The TFT 32 may be an inorganic TFT using an inorganic semiconductor layer as a channel layer, or may be an organic TFT using an organic semiconductor layer as a channel layer. The protective layer 33 and the planarizing insulating layer 34 may be made of, for example, an insulating resin material such as polyimide. If the surface of the protective layer 33 is sufficiently flat, it is possible to omit the planarizing insulating layer 34. The pixel electrode 35 may be made of, for example, a metallic material such as gold (Au), silver (Ag), and copper (Cu). The pixel electrode 35 is coupled to the TFT 32 through a contact hole (not illustrated) provided in the protective layer 33 and the planarizing insulating layer 34.

The counter substrate 40 may include, for example, a plate-like member 41 and a counter electrode 42. The counter electrode 42 is provided on a whole surface (a surface facing the drive substrate 30) of the plate-like member 41. The counter electrode 42 may be arranged in a matrix or in a segment form, in a manner similar to the pixel electrode 35.

The plate-like member 41 is made of a material similar to that of the plate-like member 31, except that the plate-like member 41 is optically transparent. For example, an optically-transmissive conductive material (a transparent electrode material) such as indium oxide-tin oxide (ITO), antimony oxide-tin oxide (ATO), fluorine-doped tin oxide (FTO), and aluminum-doped zinc oxide (AZO) may be used for the counter electrode 42.

The electrophoretic element 11 is viewed through the counter electrode 42, in a case where an image is displayed on the counter substrate 40 side. Therefore, the optical transparency (transmittance) of the counter electrode 42 may be preferably as high as possible, and may be, for example, about 80% or more. In addition, preferably, the electrical resistance of the counter electrode 42 may be as low as possible, and may be, for example, about 100 Ω/square or less.

The electrophoretic element 11 has a configuration similar to that of the electrophoretic element 11 in the above-described embodiment and modification. Specifically, the electrophoretic element 11 includes the migrating particles 10 and the porous layer 20 having the plurality of pores 23 in the insulating liquid 1. The space between the drive substrate 30 and the counter substrate 40 is filled with the insulating liquid 1, and the porous layer 20 may be supported by, for example, the spacer 60. The space filled with the insulating liquid 1 may be, for example, partitioned by the porous layer 20 serving as a border into an escape region R1 on a side close to the pixel electrode 35 and a display region R2 on a side close to the counter electrode 42. The insulating liquid 1, the migrating particle 10, and the porous layer 20 have the respective configurations similar to those in the above-described embodiment and the modification. It is to be noted that FIG. 5 and FIG. 6 to be described later each illustrate only some of the pores 23 to simplify the contents of illustration.

The porous layer 20 may be adjacent to either the pixel electrode 35 or the counter electrode 42, and the escape region R1 may not be partitioned clearly from the display region R2. The migrating particles 10 move towards the pixel electrode 35 or the counter electrode 42 in response to an electric field.

The spacer 60 may have, for example, a thickness of 10 µm to 100 µm, and may be preferably as thin as possible. This makes it possible to reduce power consumption. The spacer 60 may be configured of, for example, an insulating material such as a polymer material, and be provided, for example, in a grid between the drive substrate 30 and the counter substrate 40. The spacer 60 is not limited in particular in terms of arrangement shape, but may be preferably provided to distribute the migrating particles 10 uniformly, without disturbing the movement of the migrating particles 10.

In the display unit 3 in an initial state, the migrating particles 10 are located in the escape region R1 (FIG. 5). In this case, the migrating particles 10 are shielded by the porous layer 20 in all pixels. Therefore, when the electrophoretic element 11 is viewed from the counter substrate 40 side, the electrophoretic element 11 is in a state in which contrast is not caused (an image is not displayed).

In contrast, when a pixel is selected by the TFT 32, and an electric field is applied between the pixel electrode 35 and the counter electrode 42, the migrating particles 11 move from the escape region R1 to the display region R2 in each pixel via the porous layer 20 (the pore 23), as illustrated in FIG. 6. In this case, pixels in which the migrating particles 10 are shielded by the porous layer 20 and pixels in which the migrating particles 10 are not shielded by the porous layer 20 are both present and thus, the electrophoretic element 11 is in a state where the contrast is caused, when viewed from the counter substrate 40 side. An image is thus displayed.

According to this display unit 3, it may be possible to display, for example, a high quality image suitable for colorization and moving-image display, by using the electrophoretic element 11 having a high response speed.

(Electronic Apparatuses)

Next, description will be given of application examples of the above-described display unit 3.

The display unit 3 of the present technology is applicable to electronic apparatuses for various purposes, and the kinds of the electronic apparatuses are not limited in particular. The display unit 3 may be mounted on, for example, the following electronic apparatuses. However, a configuration of each of the electronic apparatuses to be described below is merely an example and may be modified as appropriate.

Application Example 1

FIGS. 7A and 7B each illustrate an appearance of an electronic book. This electronic book may include, for example, a display section 110, a non-display section 120, and an operation section 130. It is to be noted that the operation section 130 may be provided either on a front surface of the non-display section 120 as illustrated in FIG. 7A, or on a top surface thereof as illustrated in FIG. 7B. The display section 110 is configured of the display unit 3. It is to be noted that the display unit 3 may be mounted on a PDA (Personal Digital Assistant) having a configuration similar to that of the electronic book illustrated in FIGS. 7A and 7B.

Application Example 2

FIG. 8 illustrates an appearance of a tablet personal computer. This tablet personal computer may include, for example, a touch panel section 310 and a housing 320. The touch panel section 310 is configured of the above-described display unit 3.

Application Example 3

FIGS. 9A and 9B each illustrate appearances of a mobile telephone. FIG. 9A illustrates a front face, a left side face, a right side face, a top face, and an undersurface of the mobile telephone in a closed state. FIG. 9B illustrates a front face and a side face of the mobile telephone in an open state. This mobile telephone may be, for example, a unit in which an upper housing 710 and a lower housing 720 are connected by a coupling section (a hinge section) 730, and include a display 740, a sub-display 750, a picture light 760, and a camera 770.

4. EXAMPLES

Next, examples of the present technology will be described in detail.

Experimental Example 1

A display unit was fabricated using black (dark display) migrating particles and a white (bright display) porous layer (a particle-containing fibrous structure) by the following procedure.

Experimental Example 1-1

First, a mixed solution containing 400 ml of tetrahydrofuran and 400 ml of methanol was prepared and then, 50 g of complex oxide fine particles (copper-iron manganese oxide: DAIPYROXIDE Color TM9550, available from Dainichiseika Color & Chemicals Mfg. Co., Ltd.) was added to this solution, and supersonic wave stirring in a supersonic wave bathtub was performed (at 25° C. to 35° C., for 30 minutes). Next, 40 ml of 28% ammonia water was dripped into this dispersion liquid of the complex oxide fine particles for 30 minutes and then, a solution in which 10 g of PLENACT KR-TTS (available from Ajinomoto Fine-Techno Co., Inc.) was dissolved in 80 ml of tetrahydrofuran was dripped for 30 minutes. Next, the temperature of the supersonic wave bathtub was raised to 60° and then maintained for three hours and subsequently, the supersonic wave bathtub was cooled to room temperature, which was followed by centrifugal separation (at 6000 rpm, for ten minutes) and decantation. Next, sediment resulting from this decantation was dispersed again in a solvent mixture of tetrahydrofuran and methanol (volume ratio of 1:1), which was followed by centrifugal separation (at 6000 rpm, for ten minutes) and decantation. Sediment obtained by repeating this cleaning process three times was dried overnight in a vacuum oven at 70° C. Black migrating particles covered with the dispersion group were thereby obtained.

After the migrating particles were prepared, a dispersant and 16.7 g of an electric charge modifier (OLOA1200, available from Chevron Chemicals) were dissolved in 83.3 g of insulating liquid. Isoparaffin (IsoparG, available from Exxon Mobil Corp.) was used for the insulating liquid. 1 g of the above-described migrating particles was added to 9 g of this insulating liquid, and then ultrasonic dispersion was performed. Next, centrifugal separation (at 6000 rpm, for 90 minutes) was performed, and then, decantation was performed. Thereafter, sediment resulting from the decantation was dispersed again in the insulating liquid. Sediment obtained by repeating this cleaning process three times was added to the insulating liquid in such a manner that a pigment component became 10 wt %. Subsequently, 3.34 g of OLOA1200 and 20 g of the above-described migrating particle dispersion liquid were added to 76.7 g of this insulating liquid and then stirred, and the insulating liquid containing an additive and a black pigment was thereby obtained.

In contrast, a porous layer was formed as follows. First, titanium oxide having an average primary particle size of 250 nm and titanium oxide having an average primary particle size of 450 nm were each prepared as non-migrating particles, and were mixed to be 4 wt % in tetrahydrofuran in which a carboxylic acid-based anionic surfactant was dissolved. The resultant mixture was then stirred using a paint shaker for one hour. Afterward, centrifugal separation was performed (at 5000 rpm, for ten minutes), and the solvent was removed by decantation. Cleaning was performed three times, and sediment obtained by the cleaning was then dried overnight at 70° C. The titanium oxide covered with the carboxylic acid-based anionic surfactant was thereby obtained. Here, the titanium oxide having the average primary particle size of 250 nm and the titanium oxide having the average primary particle size of 450 nm are denoted as T-1 and T-2, respectively.

Next, polymethyl methacrylate was prepared as a material of a fibrous structure. 13 g of this polymethyl methacrylate was dissolved in 84 g of N,N'-dimethylformamide and then, titanium oxide having the primary particle size of 250 nm and titanium oxide having the primary particle size of 450 nm were added as non-migrating particles to 6.5 g of this solution, and subsequently mixed in a bead mill. A spinning solution for formation of the fibrous structure was thereby obtained. A pixel electrode made of ITO in a predetermined pattern was formed on a drive substrate and then, spinning was performed using this spinning solution. Specifically, the spinning solution was poured into a syringe, and spinning of 1.3 mg/cm$^2$ was performed on the drive substrate. A porous layer (a fibrous structure holding non-migrating particles) was formed on the drive substrate through the above-described process. An electrospinning apparatus (NANON, available from MECC Co., Ltd.) was used for the spinning.

After the porous layer was formed on the drive substrate, an unnecessary portion of the porous layer was removed from the drive substrate. Specifically, of the porous layer, a portion where the pixel electrode was not provided was removed. A counter electrode made of ITO was formed on a plate-like member as a counter substrate, and a spacer was disposed on this counter substrate. A spacer drawn with use of a photocurable resin (a photosensitive resin Photolec A-400 (registered trademark), available from Sekisui Chemical Co., Ltd.) containing beads (having an outer diameter of 30 μm) was used for the spacer, and was provided at a position that does not overlap the porous layer when the spacer was laid on the drive substrate. After the spacer was provided on the counter substrate, the counter substrate was laid on the drive substrate where the porous layer was formed. At that moment, the porous layer was so separated from the pixel electrode and the counter electrode by the spacer as to hold the porous layer. Subsequently, insulating liquid in which the above-described migrating particles were dispersed was injected between the drive substrate and the counter substrate. Finally, the photocurable resin was irradiated with ultraviolet light to complete the display unit.

Experimental Example 1-2

A display unit was fabricated by a procedure similar to that of the experimental example 1-1, except that titanium oxide having an average primary particle size of 250 nm and titanium oxide having an average primary particle size of 450 nm were used as-is without performing a modification process using a surfactant.

Experimental Example 1-3

A display unit was fabricated by a procedure similar to that of the experimental example 1-1, except that titanium oxide having an average primary particle size of 250 nm and titanium oxide having an average primary particle size of 450 nm were used as-is without performing a modification process using a surfactant, and 0.075 wt % of a carboxylic acid-based anionic surfactant was mixed when a polymer was dissolved.

As performance of the display units of these experimental examples 1-1 to 1-3, volume fraction of non-migrating particles in fibrous structure (%), white reflectance (%), black reflectance (%), and contrast (CR) immediately after fabrication, reflectance change after one minute (%), average mobility (ms), and minimum fiber diameter (nm) were examined. Results of this examination are presented in Table 1.

TABLE 1

| | Volume Fraction of Non-Migrating Particles (%) | White Reflectance (%) | Black Reflectance (%) | CR | Reflectance Change after One Minute (%) | Average Response Time (ms) | Minimum Fiber Diameter (nm) |
|---|---|---|---|---|---|---|---|
| Experimental Example 1-1 | 47 | 42 | 2 | 21 | Small | 390 | 420 |
| Experimental Example 1-2 | 47 | 36 | 3 | 12 | Moderate | 450 | 650 |
| Experimental Example 1-3 | 47 | 42 | 1.5 | 28 | Large | 250 | 340 |

The contrast was calculated from the white reflectance (%) and the black reflectance (%) as the contrast CR=white reflectance (%)/black reflectance (%). An AC voltage (0.1 Hz and 15 V) was applied to the display unit for one hour, and thereafter, the white reflectance and the black reflectance, reflectance was measured with a spectral colorimeter (CD100, available from Yokogawa Electric Corporation). The reflectance change represents the degree of a decrease in the white reflectance after one minute as compared with the white reflectance immediately after the fabrication. The reflectance change of less than 10% was determined to be small, the reflectance change of 20% or more was determined to be moderate, and the reflectance change of 20% or more was determined to be large. The average response time was calculated from the time (response time) necessary for a change in luminance assuming that luminance was 1 in a case where bright display was performed and luminance was 0 in a case where dark display was performed, and an actual gap (a distance in which a migrating particle was movable between substrates) of the fabricated display unit. Specifically, an average value of the time necessary for a change in luminance from 0.1 to 0.9 that occurred while a square-wave electric field (15 V) was applied to the display unit, and the time necessary for a change in luminance from 0.9 to 0.1 that occurred while an electric field in a reverse direction was applied to the display unit, was determined to be the response time. The response time was measured using a function generator (available from TOYO Corporation). The volume fraction of the titanium oxide was calculated from the specific gravity of the material. As for the minimum fiber diameter, the fiber diameter of a thinnest portion when the fibrous structure was observed at a magnification of 5000 times with a scanning microscope was measured.

When the experimental examples 1-1 and 1-3 in which the surfactant was included in the fibrous structure were compared with the experimental example 1-2 in which the surfactant was not included, the experimental examples 1-1 and 1-3 were superior in terms of white reflectance, black reflectance, contrast, and average response time. It is conceivable that this is because the fiber diameter of the fibrous structure was reduced by adding the surfactant. Presumably, the passage of the migrating particles increased in the experimental examples 1-1 and 1-3 in which a fiber of the fibrous structure was thinned.

Here, when the experimental example 1-1, in which the non-migrating particle was caused to react with the surfactant beforehand and the surface was covered with the surfactant, was compared with the experimental example 1-3, in which the surfactant was directly added to the spinning solution without causing reaction between the non-migrating particle and the surfactant, the white reflectance in the experimental example 1-3 was higher, and the contrast in the experimental example 1-3 was also higher. The average response time in the experimental example 1-3 was faster, but the reflectance change after one minute was considerably large. It was confirmed that this was not caused by a physical structure, because the minimum fiber diameter in the experiment 1-3 was larger than that in the experiment 1-1. It is conceivable that the CR retention after one minute deteriorated, because the functional group was exposed on the surface of the fibrous structure due to the direct addition of the surfactant to the spinning solution. To be specific, it is conceivable that this was because the dispersant and the particles in the electrophoretic solution were adsorbed on the surfactant exposed on the surface of the fibrous structure, thereby generating a force to separate the electrophoretic particles reaching the substrate.

As for the experimental example 1-1 in which the non-migrating particles were covered with the surfactant and the experimental example 1-2 in which the non-migrating particles not covered with the surfactant were used, the reflectance change after one minute in the experimental example 1-1 was smaller. It is conceivable that this was because the migrating particles were caused to reach the substrate easily by an increase in passage of the migrating particles in the pores, thereby increasing interaction between the substrates.

In this way, using the non-migrating particles modified beforehand with the surfactant improves the dispersibility of the non-migrating particles in the spinning solution. This makes it easy to apply an electric field to the non-migrating particles, and allows for thinning of the fiber of the fibrous structure during the spinning. In other words, it is possible to maintain the memorability while improving the reflectance and the contrast.

Experimental Example 2

A display unit was fabricated using black (dark display) migrating particles and a white (bright display) porous layer (a particle-containing fibrous structure) by the following procedure.

Experimental Example 2-1

First, the black migrating particles and a dispersion liquid of the migrating particles were each prepared using a method similar to that in the above-described experimental example 1.

The porous layer was formed as follows. First, titanium oxide having an average primary particle size of 450 nm was prepared as non-migrating particles and then mixed to be 4 wt % in tetrahydrofuran in which a carboxylic acid-based anionic surfactant was dissolved. The resultant mixture was then stirred using a paint shaker for one hour. Afterward, centrifugal separation was performed (at 5000 rpm, for ten minutes), and the solvent was removed by decantation. Cleaning was performed three times, and sediment obtained by the cleaning was then dried overnight at 70° C. The titanium oxide covered with the carboxylic acid-based anionic surfactant was thereby obtained.

Next, polymethyl methacrylate was prepared as a material of a fibrous structure. 13 g of this polymethyl methacrylate was dissolved in 84 g of N,N'-dimethylformamide and then, 3 g of the titanium oxide was added as non-migrating particles to 7 g of this solution, and subsequently mixed in a bead mill. A spinning solution for formation of the fibrous structure was thereby obtained. A pixel electrode made of ITO in a predetermined pattern was formed on a drive substrate and then, spinning was performed using this spinning solution. Specifically, the spinning solution was poured into a syringe, and spinning of 1.3 mg/cm$^2$ was performed on the drive substrate. A porous layer (a fibrous structure holding non-migrating particles) was formed on the drive substrate through the above-described process. An electrospinning apparatus (NANON, available from MECC Co., Ltd.) was used for the spinning.

After the porous layer was formed on the drive substrate, an unnecessary portion of the porous layer was removed from the drive substrate, in a manner similar to that in the above-described experimental example 1. Subsequently, after a spacer was provided on a counter substrate, the counter substrate was laid on the drive substrate where the porous layer was formed. At that moment, the porous layer was so separated from the pixel electrode and the counter electrode by the spacer to hold the porous layer. Subsequently, insulating liquid in which the above-described migrating particles were dispersed was injected between the drive substrate and the counter substrate. Finally, the photocurable resin was irradiated with ultraviolet light to complete the display unit.

Experimental Example 2-2

A display unit was fabricated by a procedure similar to that of the experimental example 2-1, except that 8 g of a solution S1 was used as a spinning solution and titanium oxide having a primary particle size of 450 nm was used.

Experimental Example 2-3

A display unit was fabricated by a procedure similar to that of the experimental example 2-1, except that 14 g of polymethyl methacrylate was dissolved in 86 g of N,N'-dimethylformamide and then, 8.5 g of this solution (a solution S2) and 1.5 g of titanium oxide having a primary particle size of 450 nm as non-migrating particles were used.

Experimental Example 2-4

A display unit was fabricated by a procedure similar to that of the experimental example 2-1, except that titanium oxide having a primary particle size of 250 nm was used.

Experimental Example 2-5

A display unit was fabricated by a procedure similar to that of the experimental example 2-3, except that titanium oxide having a primary particle size of 250 nm was used.

Experimental Example 2-6

A display unit was fabricated by a procedure similar to that of the experimental example 2-1, except that 2.5 g of titanium oxide having a primary particle size of 450 nm and 0.5 g of titanium oxide having a primary particle size of 250 nm were used.

As performance of the display units of these experimental examples 2-1 to 2-6, white reflectance (%), black reflectance (%), and contrast (CR) immediately after fabrication, reflectance change after one minute (%), and average mobility (ms) were examined. Results of this examination are presented in Table 2. It is to be noted that measurement and calculation of volume fraction were each performed in a manner similar to that in the experimental example 1.

The contrast was calculated from the white reflectance (%) and the black reflectance (%), as the contrast CR=white reflectance (%)/black reflectance (%). An AC voltage (0.1 Hz and 15 V) was applied to the display unit for one hour, and thereafter, the white reflectance and the black reflectance, reflectance was measured with a spectral colorimeter (CD100, available from Yokogawa Electric Corporation). The reflectance change represents the degree of a decrease in the white reflectance after one minute as compared with the white reflectance immediately after the fabrication. The reflectance change of less than 10% was determined to be small, the reflectance change of 20% or more was determined to be moderate, and the reflectance change of 20% or more was determined to be large.

The average response time was calculated from the time (response time) necessary for a change in luminance assuming that luminance was 1 in a case where bright display was performed and luminance was 0 in a case where dark display was performed, and an actual gap (a distance in which a migrating particle was movable between substrates) of the fabricated display unit. Specifically, an average value of the time necessary for a change in luminance from 0.1 to 0.9 that occurred while a square-wave electric field (15 V) was applied to the display unit, and the time necessary for a change in luminance from 0.9 to 0.1 that occurred while an electric field in a reverse direction was applied to the display unit, was determined to be the response time. The response time was measured using a function generator (available from TOYO Corporation). The volume fraction of the titanium oxide was calculated from the specific gravity of the material. As for the minimum fiber diameter, the fiber diameter of a thinnest portion when the fibrous structure was observed at a magnification of 5000 times with a scanning microscope was measured.

TABLE 2

|  | Volume Fraction of Non-Migrating Particles (%) | Portion Made of Polymer Only | White Reflectance (%) | Black Reflectance (%) | CR | Reflectance Change after One Minute (%) | Average Response Time (ms) |
|---|---|---|---|---|---|---|---|
| Experimental Example 2-1 | 48 | Small | 42 | 1.5 | 28 | Small | 350 |
| Experimental Example 2-2 | 35 | Small | 45 | 1.4 | 32 | Small | 350 |
| Experimental Example 2-3 | 26 | Small | 43 | 1.5 | 29 | Small | 380 |
| Experimental Example 2-4 | 53 | Large | 42 | 3 | 14 | Small | 420 |
| Experimental Example 2-5 | 32 | Large | 40 | 3 | 13 | Small | 400 |
| Experimental Example 2-6 | 49 | Large | 42 | 3 | 14 | Moderate | 450 |

In the experimental examples 2-1 to 2-3 in which the titanium oxide of 450 nm was used as a core, the white reflectance, black reflectance, and contrast were higher, the reflectance change after one minute was small, and the response speed was fast, as compared with the experimental examples 2-4 and 2-5 in which the titanium oxide of 250 nm was used as a core. In the experimental example 2-6 in which the titanium oxide of 250 nm and the titanium oxide of 400 nm were used, the exhibited white reflectance was equal to that in the experimental example 2-1, but the CR and the average response speed decreased, and the reflectance change after one minute increased. In addition, when the experimental examples 2-1 to 2-3 are compared, apparently, the experimental example 2-2 exhibited the best characteristics. As apparent from this, the quantity of the non-migrating particles (titanium oxide) included in the fibrous structure was preferably in a range in which the volume fraction was 26% or more and 48% or less.

In this way, the ratio of the non-migrating particles in the fibrous structure was reduced by using the non-migrating particles having a primary particle size of 450 nm or more to have a portion made of only the polymer in the fiber, so that the migrating particles easily reach the substrate and an image force is easily developed. This improves the memorability. Further, apparently, the dispersion degree of the non-migrating particles improves, thereby increasing the size of the pore while maintaining the reflectance. In other words, the response speed is also improved by a rise in porosity.

The present technology has been described above with reference to the embodiment and modification, but is not limited thereto, and may be variously modified.

It is to be noted that the effects described in the present specification are only examples and not limitative, and there may be other effects.

It is to be noted that the present technology may also have the following configurations.

(1) A display unit, including:
migrating particles and a porous layer in an insulating liquid, the porous layer being formed using a fibrous structure,
wherein the fibrous structure includes non-migrating particles having light reflectivity different from light reflectivity of the migrating particles and being at least partially modified with a surfactant.

(2) The display unit according to (1), wherein the fibrous structure includes a chain molecule having a main portion configured of a carbon atom, an oxygen atom, and a hydrogen atom, and including an ester group, and the fibrous structure holds the non-migrating particles.

(3) The display unit according to (1) or (2), wherein the surfactant is an anionic surfactant.

(4) The display unit according to any one of (1) to (3), wherein a primary particle size of the non-migrating particles is 450 nanometers or more.

(5) The display unit according to any one of (1) to (4), wherein a minimum fiber diameter of the fibrous structure is 500 nanometers or less.

(6) The display unit according to any one of (1) to (5), wherein a fiber diameter of the fibrous structure is 50 nanometers or more and 2000 nanometers or less.

(7) The display unit according to any one of (1) to (6), wherein an average pore size of the fibrous structure is 0.1 micrometers or more and 10 micrometers or less.

(8) The display unit according to any one of (1) to (7), wherein the fibrous structure is formed by an antistatic method.

(9) The display unit according to any one of (1) to (8), wherein optical reflectance of the non-migrating particles is higher than optical reflectance of the migrating particles, and the migrating particles perform dark display, and the non-migrating particles and the fibrous structure perform bright display.

(10) The display unit according to any one of (1) to (9), wherein the migrating particles and the non-migrating particles are configured of one or more of an organic pigment, an inorganic pigment, a dye, a carbon material, a metallic material, a metal oxide, glass, and a polymer material.

(11) The display unit according to any one of (1) to (10), wherein the fibrous structure is made of an acrylic resin.

(12) The display unit according to any one of (2) to (11), wherein the chain molecule is one of polyalkyl methacrylate, polyalkyl acrylate, polyalkenyl methacrylate, polyalkenyl acrylate, polyalkynyl methacrylate, and polyalkynyl acrylate.

(13) The display unit according to any one of (2) to (12), wherein the chain molecule has resistance to biodegradation.

(14) The display unit according to any one of (2) to (13), wherein an end of the chain molecule includes an atom other than the carbon atom, the oxygen atom, and the hydrogen atom that configure the main portion.

(15) The display unit according to any one of (1) to (14), wherein the insulating liquid contains a dispersant that disperses the migrating particles.

(16) The display unit according to any one of (1) to (15), wherein the non-migrating particles include large particles and small particles having primary particle sizes different from each other.

(17) A method of manufacturing a display unit, the method comprising:
forming migrating particles;
modifying non-migrating particles with a surfactant, the non-migrating particles having light reflectivity different from light reflectivity of the migrating particles; and
forming a fibrous structure mixed with the non-migrating particles and used to configure a porous layer.

(18) An electronic apparatus provided with a display unit, the display unit including:
migrating particles and a porous layer in an insulating liquid, the porous layer being formed using a fibrous structure,
wherein the fibrous structure includes non-migrating particles having light reflectivity different from light reflectivity of the migrating particles and being at least partially modified with a surfactant.

This application claims the benefit of Japanese Priority Patent Application No. JP 2014-057885 filed with the Japan Patent Office on Mar. 20, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display unit, comprising:
migrating particles and a porous layer in an insulating liquid, the porous layer being formed using a fibrous structure,
wherein the fibrous structure includes non-migrating particles having light reflectivity different from light reflectivity of the migrating particles and being at least partially modified with a surfactant.

2. The display unit according to claim 1, wherein the fibrous structure includes a chain molecule having a main portion configured of a carbon atom, an oxygen atom, and a hydrogen atom, and including an ester group, and the fibrous structure holds the non-migrating particles.

3. The display unit according to claim 1, wherein the surfactant is an anionic surfactant.

4. The display unit according to claim 1, wherein a primary particle size of the non-migrating particles is 450 nanometers or more.

5. The display unit according to claim 1, wherein a minimum fiber diameter of the fibrous structure is 500 nanometers or less.

6. The display unit according to claim 1, wherein a fiber diameter of the fibrous structure is 50 nanometers or more and 2000 nanometers or less.

7. The display unit according to claim 1, wherein an average pore size of the fibrous structure is 0.1 micrometers or more and 10 micrometers or less.

8. The display unit according to claim 1, wherein the fibrous structure is formed by an antistatic method.

9. The display unit according to claim 1, wherein optical reflectance of the non-migrating particles is higher than optical reflectance of the migrating particles, and the migrating particles perform dark display, and the non-migrating particles and the fibrous structure perform bright display.

10. The display unit according to claim 1, wherein the migrating particles and the non-migrating particles are configured of one or more of an organic pigment, an inorganic pigment, a dye, a carbon material, a metallic material, a metal oxide, glass, and a polymer material.

11. The display unit according to claim 1, wherein the fibrous structure is made of an acrylic resin.

12. The display unit according to claim 2, wherein the chain molecule is one of polyalkyl methacrylate, polyalkyl acrylate, polyalkenyl methacrylate, polyalkenyl acrylate, polyalkynyl methacrylate, and polyalkynyl acrylate.

13. The display unit according to claim 2, wherein the chain molecule has resistance to biodegradation.

14. The display unit according to claim 2, wherein an end of the chain molecule includes an atom other than the carbon atom, the oxygen atom, and the hydrogen atom that configure the main portion.

15. The display unit according to claim 1, wherein the insulating liquid contains a dispersant that disperses the migrating particles.

16. The display unit according to claim 1, wherein the non-migrating particles include large particles and small particles having primary particle sizes different from each other.

17. A method of manufacturing a display unit, the method comprising:
forming migrating particles;
modifying non-migrating particles with a surfactant, the non-migrating particles having light reflectivity different from light reflectivity of the migrating particles; and
forming a fibrous structure mixed with the non-migrating particles and used to configure a porous layer.

18. An electronic apparatus provided with a display unit, the display unit comprising:
migrating particles and a porous layer in an insulating liquid, the porous layer being formed using a fibrous structure,
wherein the fibrous structure includes non-migrating particles having light reflectivity different from light reflectivity of the migrating particles and being at least partially modified with a surfactant.

* * * * *